Patented Feb. 6, 1951

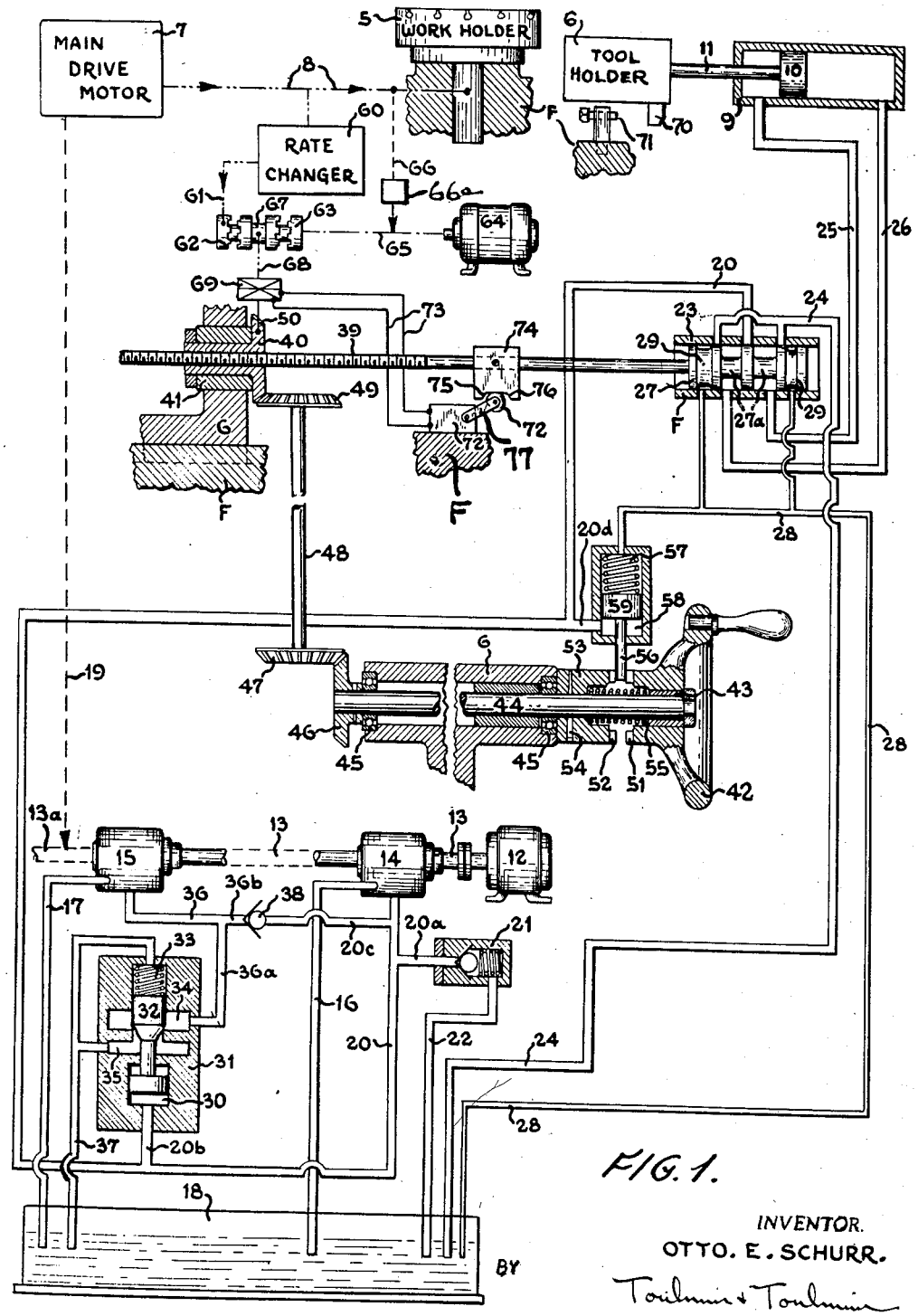

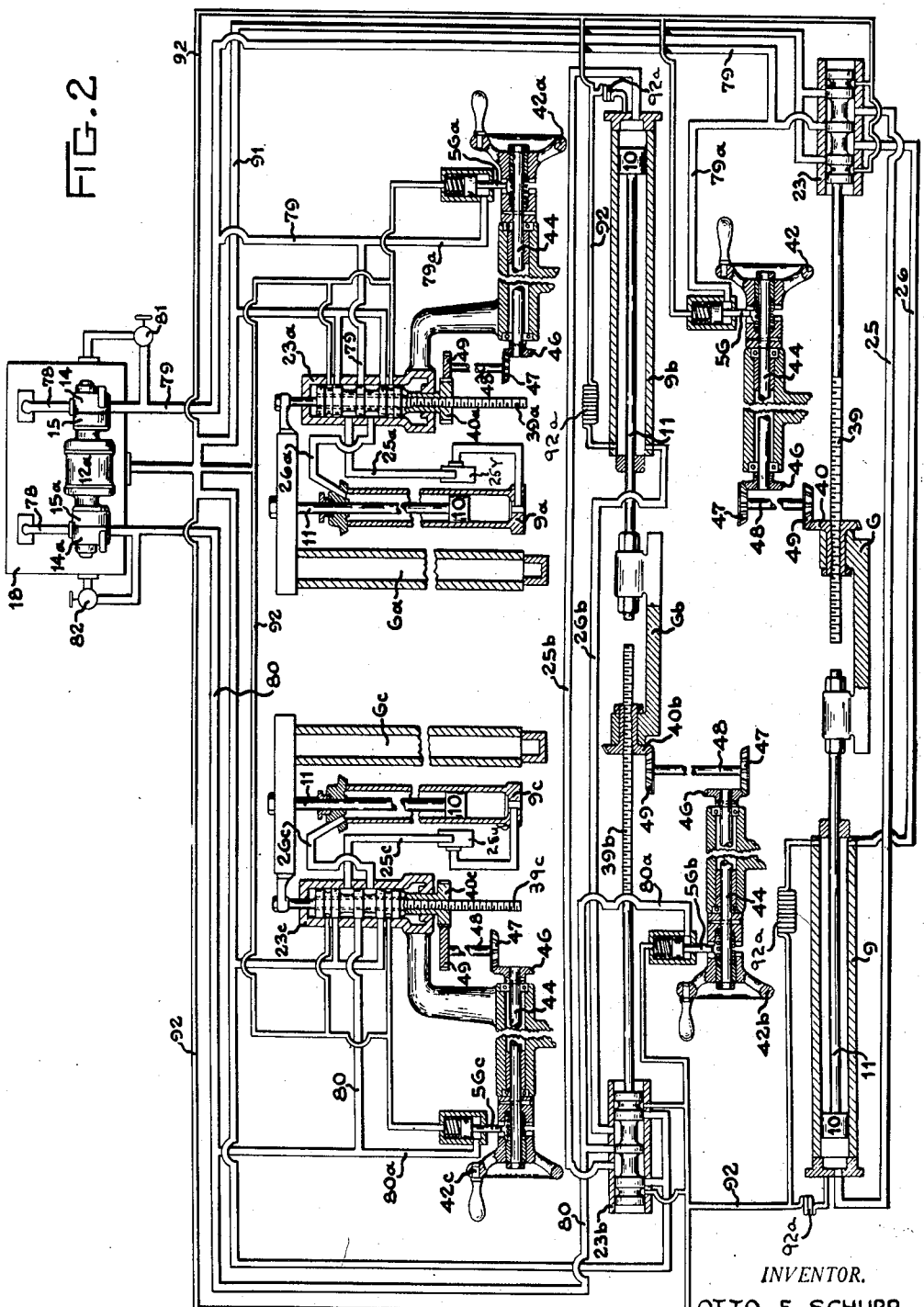

2,540,381

UNITED STATES PATENT OFFICE 2,540,381

HYDRAULIC SERVOMOTOR MECHANISM

Otto E. Schurr, Hamilton, Ohio, assignor to Lima-Hamilton Corporation, Hamilton, Ohio, a corporation of Virginia Original application December 21, 1945, Serial No. 636,390, now Patent No. 2,527,458, dated October 24, 1950. Divided and this application August 17, 1948, Serial No. 44,681

7 Claims. (Cl. 121—45)

This invention pertains to a hydraulic circuit for machine tools, and is a division of my application Serial No. 636,390, filed December 21, 1945 and now matured as Patent No. 2,527,458, issued October 24, 1950. More particularly, this invention pertains to an improved hydraulic operating and control circuit for the relatively movable members of a machine tool.

One of the objects of this invention is to provide a hydraulic circuit for effecting the relative movement of the work and tool holders of a machine tool in a highly efficient and accurate manner.

Another object is to provide, in a hydraulic circuit having manually operable servo control means, an arrangement for automatically rendering the manual operating means for the servo control means ineffective when pressure is reduced below a predetermined operating value in the circuit.

And a further object is to provide a hydraulic circuit having a power driven servo valve means for controlling the movement of a machine tool member which is adapted to automatically disconnect the power drive from the servo valve means when the movement of the machine member is arrested by an external force or fixed abutment.

Further features and advantages of this invention will appear from a detailed description of the drawings in which:

Figure 1 is a diagram showing the application of this novel hydraulic circuit to a machine tool having relatively movable work and tool holding members.

Figure 2 is a diagram showing the application of the hydraulic circuit of Figure 1 to a machine tool having a plurality of movable members.

Referring to Figure 1, the novel hydraulic circuit is shown applied to a machine tool having a work holder 5 and a tool holder 6 movable relative thereto. In this particular illustration, the work holder 5 is of the rotary or work spindle type and is driven from a source of power or main drive motor 7 through a suitable mechanical power transmission indicated by the line 8. The tool holder 6 is actuated by means comprising a fluid pressure cylinder 9 having a piston 10 and piston rod 11 appropriately connected to the tool slide or tool holder 6.

Power for actuating the fluid in the hydraulic circuit is derived from a suitable source of power or hydraulic pump motor 12 which is connected through a suitable drive connection and shaft 13 to a high pressure hydraulic pump 14 and a low pressure hydraulic pump 15. Each of these pumps receives a fluid supply through their respective suction lines 16 and 17 from the fluid reservoir 18.

It is also within the contemplation of this invention to drive the hydraulic pumps 14 and 15 directly from the main drive motor as indicated by the broken line arrow 19 which represents diagrammatically a suitable power transmission connected to the shaft 13a for driving both of the pumps 14 and 15. In this respect, a separate hydraulic drive motor 12 would be dispensed with and there would then be provided an arrangement whereby the main drive motor directly actuated the work spindle 5 and also provided the power for energizing the hydraulic circuit for operating the tool holder 6.

The high pressure pump 14 at all times discharges fluid pressure into the main pressure supply line 20. A branch line 20a of this main supply line 20 is connected to a suitable pressure relief valve 21 which is in turn connected through the drain line 22 for return of discharged fluid from the valve 21 to the reservoir 18, the purpose of this valve being to limit the maximum pressure which may be developed in the line 20 to safe operating limits.

It will be noted that a single pressure supply line 20 is connected to the hydraulic servo control valve 23. A main discharge, return, or drain line 24 is also connected to the valve for the return of fluid to the reservoir 18. Appropriate operating lines 25 and 26 are interconnected between the servo valve 23 and the operating cylinder 9 for the tool holder 6.

In the servo valve 23 is provided an axially reciprocatable control plunger 27 having appropriate grooves 27a aligned with the supply line 20 and drain lines 24 so that movement of this valve plunger may reversibly control the direction and also the rate of flow of fluid to and from the cylinder 9. In conjunction with the valve 23, there is also provided an auxiliary seepage drain line 28 which is arranged to connect with the grooves 29 of the servo valve plunger so as to receive any leakage from each end of the valve plunger during the normal operation of the valve. This supplemental drain or seepage line 28, it is to be noted, is connected to the reservoir for return of seepage fluid independent of the normal main return line 24. In this way, the surge in the line 24 caused by maximum displacement of the servo valve plunger 27 during rapid traverse movement of tool holder 6 is not permitted to cause leakage to go past the ends of the valve plunger 27.

The servo valve plunger 27, when displaced slightly from its centralized or stop position for the cylinder 9, effects feeding movements with high fluid pressure in the tool holder 6. Under these conditions of feed movements the high pressure pump 14 transmits fluid at low volume and high pressure through the supply line 20 to the servo valve 23. The high pressure existing in the line 20 at this time is transmitted through a branch line 20b to the pressure chamber 30 of the bypass control valve 31 so as to raise its plunger 32 against the compression spring 33 connecting the chamber 34 with the chamber 35. This allows discharge from the low pressure pump 15 at a predetermined pressure, determined by the spring 33 opposing the pressure in the chamber 30, to pass through the lines 36 and 36a to enter the drain line 37 for return of fluid to the reservoir 18. Under normal feeding conditions the low pressure pump pressure supply is thus bypassed so that it merely circulates fluid from the line 17 to the line 36, through the valve 31 to the drain line 37.

Should it be desired to effect rapid traverse movements in the tool holder 6, the valve plunger 27 of the servo valve 23 is displaced a relatively large amount from its neutral or stop position. This provides a large discharge opening from the cylinder 9 to the main drain line 24 and correspondingly decreases the pressure required to move its piston 10 by pressure supplied by the line 20. Pressure thus drops in the line 20 during rapid traverse movements which in turn, through the branch line 20b, decreases pressure in the pressure chamber 30 of the bypass valve 31. The plunger 32 is thus forced downwardly by the greater pressure of the spring 33, closing discharge from the low pressure pump 15 through the lines 36 and 36a into the drain line 37. At the same time, the pressure drop in the line 20 decreases below the pressure in the line 36 as normally maintained by the spring 33 opposing the pressure in the chamber 30 acting on the plunger 32 so that the check valve 38 opens so that fluid pressure from the low pressure pump 15 passes through the line 36 and the line 36b through the check valve 38 into the branch line 20c of the main supply line 20. In this way, the low pressure pump 15 automatically supplements the flow provided by the high pressure pump 14 to provide an additional low pressure large volume supply in the line 20 to effect the desired rapid traverse movement in the tool holder 6. Thus it can be seen that the servo control valve 23 is arranged to be supplied by fluid pressure from a dual pump and that the single supply line connected to the servo valve is capable of providing any desired feed or rapid traverse movement for the tool slide actuating cylinder by merely effecting the desired amount of displacement of the servo valve plunger.

The servo valve plunger 27 is preferably actuated by a servo valve screw 39 which is attached to the valve plunger 27 and arranged for axial movement to reciprocate the valve plunger but provided with any suitable means to maintain it in nonrotatable condition. Preferably, the servo valve 23 is mounted rigidly on the machine frame while an actuating nut 40 is journaled against axial displacement in a suitable bearing 41 fixed in the actuable member, tool slide, or tool holder 6. By rotating the nut 40 the screw 39 and the connected valve plunger 27 are moved relative to the valve 23 momentarily during the initial adjustment of the valve. The rotation of the nut 40 also re-adjusts the position of the valve plunger 27 and screw 39 relative to the tool carrier 6 to in this way effect the relative servo control movement of tool slide as in a conventional manner for such servo valve mechanism.

The nut 40 may be rotated manually by means of a hand wheel 42 which is journaled for axial sliding movement on a suitable bearing 43 on the shaft 44. This shaft is journaled on bearings 45 preferably on the tool carrier 6. The shaft 44 is provided with a bevel gear 46 which in turn meshes with a mating bevel gear 47 on a shaft 48 which in turn has a bevel gear 49 adapted to engage a bevel gear 50 formed on the servo screw nut 40. The hand wheel is provided with clutch teeth 51 which are adapted to engage mating clutch teeth 52 on a clutch member 53 fixed to the shaft 44 by a pin 54. A compression spring 55 normally holds the hand wheel 42 in disengaged position of the clutch teeth 51 and 52. When the hand wheel 42 is pushed inwardly to engage these clutch teeth and rotated, the nut 40 may thus be relatively adjusted to move the screw 39 and valve plunger 27 relative to the tool slide 6 and valve 23 to effect the servo control.

Means are provided for automatically rendering the hand wheel ineffective to adjust the servo valve when the fluid pressure pumps 14 and 15 are not operating or the pressure in the hydraulic circuit has dropped below a predetermined safe operating level. A lockout plunger 56 is arranged to be moved between the clutch members 51 and 52 by a suitable compression spring 57 when fluid pressure in the line 20 and branch line 20d drops below a predetermined safe operating level or drops to zero when the pumps 14 and 15 are not being driven. Thus the hand wheel 42 cannot be moved inwardly to engage the clutch teeth 51 and 52 under these conditions. As soon as the pumps 14 and 15 are started so that proper operating pressure exists in the main line 20, pressure in the branch line 20d enters in the pressure chamber 58 behind the lockout plunger 56 to raise its piston 59 against the spring 57, thus withdrawing the plunger 56 and permitting engagement of the hand wheel clutch members 51 and 52. The purpose of this arrangement is to prevent re-adjusting the servo valve when the machine is shut down, particularly to a wide open position, and then energizing the hydraulic pump motor 12. This would cause a surge of pressure in the tool slide cylinder which in turn causes the tool slide to jump ahead and thereby move the servo valve beyond its other position and damage the valve or otherwise position the servo valve plunger in an inoperative location. Thus, with this arrangement, the tool slides and servo valves cannot be adjusted by the hand wheels so long as the hydraulic system is inoperative.

The servo screw nut 40 may also be reversibly driven by power received from the main drive motor and transmission indicated by the line 8 through a rate changer 60 including a suitable feed reverser which effects different rates of variable speed output through suitable transmission mechanism indicated by the line 61 which is connected to one member 62 of a feed and rapid traverse clutch. The other member of this clutch is connected to a reversible rapid traverse driving power source such as a rapid traverse electric motor 64 connected through a suitable transmission indicated by the line 65 to the member 63. The clutch member 63 may also, if desired, be driven by a connection indicated by the broken arrow 66 directly from the main drive motor and transmission 8, in which case the separate rapid traverse motor 64 would not be utilized, while a suitable reverser 66a is provided for reversing the rapid traverse drive.

A suitable clutch selector member 67 is alternately connectable to the member 62 for feed movements or other member 63 for rapid traverse movements to transmit power from the member 67 through a suitable power transmission indicated by the line 68 and through a magnetic clutch 69 to the servo screw nut 40. Thus, in this arrangement, the servo screw nut may be operated at variable feeding speeds by the rate changer 60 or at rapid traverse rate, either from the independent electric rapid traverse motor 64 or from the main drive motor 7 through the drive connection 8—66—65.

In certain types of machine tools, it is desirable and essential to move the tool feeding device 6, having an integral lug 70, up against a fixed abutment 71 carried in the machine frame F so as to positively stop the tool slide in a predetermined accurate position. In a servo valve control mechanism which is power driven as above described, when the tool slide reaches and engages the fixed abutment, the servo valve plunger 27 and screw 39 continue to be adjusted in displaced position and thereby to further open the servo valve and apply additional fluid pressure to the operating cylinder 10 for the tool slides 6. It is therefore desirable to at some point during this over-adjustment of the servo control valve after the tool slide engages the abutment, to automatically arrest further adjustment of the servo valve plunger. There has therefore been provided an automatic means to stop further adjustment of the servo valve after a predetermined amount of adjustment has taken place in the servo valve plunger upon engagement of the tool slide with the fixed abutment.

As an example of a preferred arrangement to accomplish this result, there is provided a limit switch 72 carried on the machine frame F which is operatively electrically connected through suitable leads 73 and electrical apparatus with the magnetic clutch 69. On the servo screw 39 is fixed an actuating cam 74 having appropriate cam surfaces 75 and 76 which engage and operate the control arm 77 of the limit switch 72 when the relative adjustment of the screw 39 and servo plunger 27 exceeds a predetermined value either side of the neutral or stop position of the valve. Thus, as the tool slide engages the abutment 71 and its motion is definitely stopped, the servo screw continues to be adjusted by the power drive above described until the relative movement of the screw 39 causes either surface 75 or 76 to engage the limit switch 72. The magnetic clutch 69 is thus de-energized to automatically disconnect all power drive to the servo screw nut and bring the servo valve to a stop in an opened position.

In order to reverse or back the tool slide away from the fixed abutment, the operator engages the manual control hand wheel 42 to connect the clutch members 59 and 52 and rotates the hand wheel in the reverse direction until the servo valve has been brought back toward the neutral or stop position. As soon as the servo valve has thus been re-adjusted toward its neutral position, limit switch 72 is released and the magnetic clutch 69 is re-energized so as to again complete the power drive connection to the servo screw nut. The power feed or rapid traverse drive may then be operated in the reverse direction to effect the power control of the servo valve for automatically returning the tool holder away from the abutment to initial cutting position for the beginning of another work cycle.

In Figure 2 is shown the application of these hydraulic circuit principles to a machine tool having a plurality of actuable members or tool slides or holders 6, 6a, 6b, and 6c, each appropriately mounted on the machine frame and connected to be moved by the respective fluid pressure cylinders 9, 9a, 9b, and 9c. Each of these cylinder is provided with appropriate pistons 10 and piston rods 11 connected to the tool slides or holders 6 to 6c inclusive. Each of the cylinders 9 to 9c inclusive is controlled by appropriate servo valves 23, 23a, 23b, and 23c in the manner shown in Figure 1. The cylinders are each connected by suitable connecting lines 25 and 26, 25a and 26a, 25b and 26b, and 25c and 26c, respectively to the servo valves 23 to 23c inclusive. Gravity balancing valves 25y are connected in lines 25a and 25c to offset the downward weight of the tool bars 6a and 6c by providing free flow from the servo valves 23a and 23c to the bottom of the cylinders 9a and 9c, but providing a restricted flow out of the bottom of these cylinders to balance the normal downward movement of the tool bars. This allows the same effective servo control for both up and down movements of the bars. Each of these servo valves may be controlled by power applied to the servo screws 39, 39a, 39b, and 39c through the respective nuts 40, 40a, 40b, and 40c as in Figure 1, or manual control may be effected by the hand wheels 42, 42a, 42b, and 42c as in Figure 1.

In connection with slides 6 and 6b, the hand wheel actuating mechanism for adjusting the threaded rods connected with the servo valve members are carried by the slides so as to move therewith. In this manner the gearing connecting the hand wheels with the threaded rods is always engaged and the rods can be manually adjusted at any time that it is possible to engage the clutches associated with the hand wheels.

The hand wheel mechanism associated with the slides 6a and 6c, on the other hand, are stationary as are housings of the servo valves 23a and 23c. However, the spur gearing 49, 40c for servo valve 23c and 49, 40a for servo valve 23a permit a certain amount of reciprocation of the threaded valve adjusting rods relative to the hand wheel structures. Inasmuch as the valves are normally maintained very close to their center position, the said threaded rods will at all times be drivingly engaged with the hand wheel mechanism and can be adjusted thereby at any time the clutches of the hand wheels can be engaged.

The source of fluid pressure in this arrangement is derived from a pair of dual tool pumps 14—15 and 14a—15a. Each of these dual pumps 14—15 and 14a—15a is driven from a common source of power or electric motor 12a and receive a supply of fluid through the suction lines 78. The dual pump 14—15 transmits pressure through a single pressure supply line 79 which is connected to the servo valves 23 and 23a while the dual pump 14a—15a transmits pressure through another single pressure supply line 80 to the servo valves 23b and 23c. This system is so arranged that one or the other or both of the dual pumps may be operated to supply pressure to the respective lines 79 and 80. This may be accomplished by providing bypass valves 81 and 82 for connecting the discharge from the respective pumps back to the reservoir 18 when it is desired to cut out one or the other of these pumps when the motor 12a is energized. Thus, in this system some of the tool slides may be rendered inoperative even though the hydraulic pump motor 12a is energized.

It is to be further noted that individual lookout plungers 56 are provided for each of the hand wheel controls in a manner as shown in Figure 1 and appropriately connected to the corresponding pressure supply lines for the associated servo valve of each particular hand wheel. In other words, the hand wheels 42 and 42a are provided with the lockout plungers 56 and 56a, these lockout plungers being operatively hydraulically connected by suitable lines 79a with the pressure supply line 79 from the dual pump 14—15. The hand wheels 42b and 42c are provided with the lockout plungers 56b and 56c connected through the branch lines 80a with the pressure supply line 80 from the other dual pump 14a—15a. Thus, each of the tool slides or carriers 9, 9a, 6a, or 6c may be operated independently of one another with this hydraulic circuit arrangement with all of the various desired servo control functions for the group of tool slides rendered manually operative by the readily available hand wheels 42, 42a, 42b, and 42c.

Each of the servo control valves is connected to a main drain or return line 91, as in Figure 1, for the return of fluid to the reservoir 18, and it is to be noted that each of the actuating cylinders for the tool slides is provided with bleeder lines 92 having air bleeder choke coils 92a connected through an independent circuit indicated generally at 92 for return of seepage and bleeder discharge from the cylinders and servo valves to the fluid reservoir or to the main drain line at a point remote from the connection of the main drain line with the servo valves.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

I claim:

1. In a hydraulic servomotor mechanism for a fluid motor having a relatively reciprocable piston and cylinder, a servo valve hydraulically connected to said cylinder comprising a casing stationary with one of said piston and cylinder and a valve member reciprocable in the casing and having a connection with the other of said piston and cylinder for movement in unison therewith, said valve member having a neutral position for interrupting fluid flow to said cylinder, and being movable in opposite directions from its neutral position to direct fluid to one end or the other of said cylinder, said connection being adjustable in length, actuating means operable for effecting adjustment of said connection to move said valve member from its neutral position thereby to bring about a supply of fluid to said cylinder to move the piston and cylinder relatively in a direction to return said valve member toward its neutral position, and means responsive to a predetermined movement of said valve member from its neutral position in said casing in either direction for making said actuating means ineffective.

2. In a hydraulic servomotor mechanism for a fluid motor comprising a cylinder and piston, a servo valve connected with said cylinder comprising a casing rigid with said cylinder and a valve member reciprocable therein and having a connection with said piston for movement in unison therewith, said valve member having a neutral position in said casing for interrupting fluid flow to said cylinder and being movable in opposite directions from the neutral position for reversibly directing fluid to said cylinder, said connection being adjustable in length, actuating means operable for adjusting the length of said connection for shifting said valve member in said casing, whereby fluid is directed to the cylinder to move the piston in a direction to return the valve member to its neutral position, and means responsive to a predetermined amount of movement of said valve member from its neutral position in said casing in either direction for disconnecting said actuating means from said connection.

3. In a hydraulic servomotor mechanism for a fluid motor having a piston and cylinder, a servo valve hydraulically connected with said cylinder comprising a casing rigid with said cylinder and a valve member reciprocable in the casing and having a screw threaded connection with said piston, said valve member being movable in the casing from a neutral position where fluid flow to the cylinder is interrupted in opposite directions for reversibly directing fluid to said cylinder, actuating means connected for adjusting said screw-threaded connection between said valve member and piston, and means responsive to a predetermined movement of said valve member in said casing in either direction from the said neutral position for automatically disconnecting said actuating means from said threaded connection.

4. In a servomotor mechanism for a fluid motor having a piston and cylinder, a servo valve comprising a casing rigid with said cylinder and hydraulically connected therewith, a valve member reciprocable in said casing for reversibly controlling fluid flow to said cylinder, a threaded rod on said valve member, a nut in engagement with said rod and movable with said piston whereby said piston and valve member normally move in unison but said nut can be rotated for shifting said valve member in the casing, thereby to bring about the actuation of said piston, actuating means connected with said nut for selectively driving it in one direction or the other, and means responsive to a predetermined amount of movement of said valve member in said casing in either direction from its neutral position for disconnecting said actuating means from said nut.

5. In a hydraulic servomotor mechanism for a fluid motor having a piston and cylinder, a servo valve having a casing hydraulically connected with said cylinder and rigid therewith and also having a valve member reciprocable in the casing for reversibly controlling the fluid supply to said cylinder, a rod on said valve member having threads thereon, a nut engaging said threads and mounted for movement with said piston whereby said piston and valve member normally move in unison, actuating means connected with said nut for selectively driving it in one direction or the other, thereby to adjust said valve member in its casing to bring about the actuation of said piston, abutment means for halting said piston in a predetermined position, and means responsive to continued movement of said valve member after said piston has been halted by the said abutment as brought about by the driving of said nut for effecting disengagement of the said actuating means from said nut.

6. In a servo motor mechanism for a fluid motor having a piston and cylinder, a servo valve comprising a casing rigid with said cylinder and hydraulically connected therewith, a valve member reciprocable in said casing for reversibly controlling fluid flow to said cylinder, a threaded rod on said valve member, a nut in engagement with said rod and movable with said piston whereby said piston and valve member normally move in unison but said nut can be rotated for shifting said valve member in the casing, thereby to bring about the actuation of said piston, actuating means connected with said nut for selectively driving it in one direction or the other, means responsive to a predetermined amount of movement of said valve member in said casing in either direction from its neutral position for disconnecting said actuating means from said nut, and manually operated means selectively operable for actuating said nut independently of said actuating means.

7. In a servomotor mechanism for a fluid motor having a piston and cylinder, a servo valve comprising a casing rigid with said cylinder and hydraulically connected therewith, a valve member reciprocable in said casing for reversibly controlling fluid flow to said cylinder, a threaded rod on said valve member, a nut in engagement with said rod and movable with said piston whereby said piston and valve member normally move in unison but said nut can be rotated for shifting said valve member in the casing, thereby to bring about the actuation of said piston, actuating means connected with said nut for selectively driving it in one direction or the other, means responsive to a predetermined amount of movement of said valve member in said casing in either direction from its neutral position for disconnecting said actuating means from said nut, manually operated means selectively operable for actuating said nut independently of said actuating means, said manually operable means being normally disengaged from said nut and being manually engageable therewith, and means responsive to the pressure of the actuating fluid controlled by said servo valve for preventing manual engagement of said manually operable means whenever the said pressure is below a predetermined amount.

OTTO E. SCHURR.

REFERENCES CITED

The following references are of record in the file of this patent:

UNITED STATES PATENTS

| Number | Name | Date |
|---|---|---|
| 832,072 | Lyndon | Oct. 2, 1906 |
| 1,508,138 | Foote | Sept. 9, 1924 |
| 1,909,166 | Burrell | May 16, 1933 |
| 2,235,085 | Roehm | Mar. 18, 1935 |
| 2,317,549 | Muller | Apr. 27, 1943 |
| 2,387,215 | Fawkes | Oct. 16, 1945 |
| 2,430,175 | Hornbostel | Nov. 4, 1947 |